US006855844B1

(12) United States Patent
Geiger et al.

(10) Patent No.: US 6,855,844 B1
(45) Date of Patent: Feb. 15, 2005

(54) PHTALIC ANHYDRIDE BASED POLYESTER-ETHER POLYOLS AND DOUBLE METAL CYANIDE CATALYST SYSTEM FOR PREPARING SAME

(75) Inventors: Eric J. Geiger, Fox Lake, IL (US); Douglas K. Hillshaffer, Western Springs, IL (US)

(73) Assignee: Stepan Company, Northfield, IL (US)

( * ) Notice: Subject to any disclaimer, the term of this patent is extended or adjusted under 35 U.S.C. 154(b) by 169 days.

(21) Appl. No.: 09/696,675

(22) Filed: Oct. 25, 2000

Related U.S. Application Data

(63) Continuation-in-part of application No. 09/427,050, filed on Oct. 25, 1999, now Pat. No. 6,569,352.

(51) Int. Cl.$^7$ .................. C07C 41/03; C07C 43/10; C07C 43/13

(52) U.S. Cl. ........... 560/76; 252/182.27; 252/182.28; 560/79; 560/89; 560/91; 560/96; 560/190; 560/198; 560/200; 568/593; 568/607

(58) Field of Search ............ 252/182.27, 182.28; 560/76, 79, 89, 91, 96, 190, 198, 200; 568/593, 607

(56) References Cited

U.S. PATENT DOCUMENTS

| | | | | |
|---|---|---|---|---|
| 3,459,733 | A | 8/1969 | Byrd et al. | 521/169 |
| 3,829,505 | A | 8/1974 | Herold | 568/606 |
| 3,941,849 | A | 3/1976 | Herold | 528/92 |
| 4,335,188 | A | 6/1982 | Igi et al. | 428/458 |
| 4,390,688 | A | 6/1983 | Walz et al. | 528/295.3 |
| 4,477,589 | A | 10/1984 | van der Hulst et al. | 502/169 |
| 4,544,679 | A | 10/1985 | Tideswell et al. | 521/116 |
| 4,644,027 | A | 2/1987 | Magnus et al. | 524/375 |
| 4,644,047 | A | 2/1987 | Wood | 528/176 |
| 4,647,595 | A | 3/1987 | Kozawa et al. | 521/158 |
| 4,791,148 | A | 12/1988 | Riley et al. | 521/159 |
| 4,888,365 | A | 12/1989 | Riley et al. | 521/157 |
| 4,981,879 | A | 1/1991 | Snider | 521/131 |
| 4,985,491 | A | 1/1991 | Reisch | 524/875 |
| 5,021,507 | A | 6/1991 | Stanley et al. | 525/127 |
| 5,164,422 | A | 11/1992 | Londrigan et al. | 521/159 |
| 5,670,601 | A | * | 9/1997 | Allen et al. | 528/76 |
| 5,750,580 | A | * | 5/1998 | Mayer et al. | 521/51 |
| 5,863,980 | A | | 1/1999 | Choi et al. | 524/591 |
| 6,569,352 | B1 | * | 5/2003 | Hillshafer et al. | 252/182.27 |
| 6,753,402 | B1 | * | 6/2004 | Bauer et al. | 528/76 |

FOREIGN PATENT DOCUMENTS

| | | |
|---|---|---|
| DE | 148957 | 3/1904 |
| EP | 0 394 736 A3 | 10/1990 |
| GB | 1149726 | 10/1965 |
| WO | WO/01/27185 | 4/2001 |

OTHER PUBLICATIONS

J. Kuyper and G. Boxhoorn, (1987), "Hexacyanometallate Salts used a s Alkene–Oxide Polymerization Catalyst s and Molecular Sieves" Journal of Catalysis 105: pp. 163–174.

* cited by examiner

Primary Examiner—Rabon Sergent
(74) Attorney, Agent, or Firm—McAndrews, Held & Malloy, Ltd.

(57) ABSTRACT

Disclosed are polyester-ether polyols and their use in urethane prepolymers, urethane foams and non-foam urethane coatings, adhesives, sealants and/or elastomers. Methods for producing such polyester-ether polyols using double metal cyanide catalysts are disclosed, along with methods for producing urethane prepolymers. The polyester-ether polyols of the instant invention are preferably the reaction product of phthalic anhydride, diethylene glycol, and propylene oxide. These polyester-ether polyols are useful as either the primary polyol in urethane compositions or in combination with conventional auxiliary polyester- and/or polyether-based polyols. The polyester-ether polyols impart greatly improved solubility and compatibility to mixtures of either polyether and/or polyester polyols. The polyester-ether polyols of the instant invention are desirably of lower viscosity than their precursor intermediate polyester polyols and are generally soluble in either polyester- and/or polyether-based polyols. Additionally, the polyester-ether polyols generally provide improved hydrolytic stability to CASE materials in which they are utilized.

4 Claims, No Drawings

PHTALIC ANHYDRIDE BASED POLYESTER-ETHER POLYOLS AND DOUBLE METAL CYANIDE CATALYST SYSTEM FOR PREPARING SAME

This application is a Continuation-In-Part of U.S. patent application Ser. No. 09/427,050, filed Oct. 25, 1999, now U.S. Pat. No. 6,569,352.

BACKGROUND OF THE INVENTION

1. Field of the Invention

Disclosed are polyester-ether polyols and methods for producing such polyester-ether polyols employing a double metal cyanide catalyst, along with urethane prepolymers and methods for producing urethane prepolymers comprising the polyester-ether polyols. Such polyols and urethane prepolymers are useful in the preparation of urethane foams and/or non-foam urethanes, wherein the polyester-ether polyol is either the primary polyol component or is utilized in combination with conventional auxiliary polyester- and/or polyether-based polyols. The invention further relates to urethane foam and non-foam urethane compositions such as coatings, adhesives, sealants, and elastomers, which may be prepared utilizing the polyester-ether polyols and/or the urethane prepolymers derived therefrom. The polyols of the instant invention are preferably the reaction product of phthalic anhydride and diethylene glycol, to produce an intermediate polyester polyol, which is subsequently reacted with an alkylene oxide, e.g., propylene oxide, in the presence of a double metal cyanide catalyst, e.g., a zinc hexacyanometallate and in particular a zinc hexacyanocobaltate, to produce the subject polyester-ether polyols. These polyester-ether polyols impart greatly improved solubility and compatibility to or with mixtures of known alkylene oxide polyols (e.g., polypropylene oxide based polyether polyols) and polyester polyols. The polyester-ether polyols of the instant invention are desirably of lower viscosity than precursor polyester polyols and are generally soluble in either polyester- and/or polyether-based polyols.

2. Description of the Related Art

Desirable physical properties of non-foam polyurethane coatings, adhesives, sealants and elastomers (CASE) include, among others, durability, flexibility, rigidity, hardness, toughness, resistance to abrasion, ability to bond to various substrates, and resistance to chemicals; one of the most desirable properties is hydrolytic stability. Coatings, adhesives, sealants and elastomers which are not resistant to hydrolysis undergo chain scission and gradual degradation of the other physical properties. Desirable properties of finished urethane foams include beneficial insulation characteristics and flame retardency. Industrial polyurethanes are generally made from the reaction of isocyanates/polyisocyanates and materials with multiple hydroxyl moieties ("polyols"). In many foam, adhesive and coatings formulations, polyols comprise the majorty of the formulation weight, so that the final product properties are influenced mostly by the polyols.

Of the commercially available polyols, polyether- and polyester-containing materials are dominant. Polyether polyols are usually based on propylene oxide, ethylene oxide or tetrahydrofuran. These typically exhibit very good resistance to hydrolysis, which is an important requirement of many adhesives and coatings. However, polyether polyols promote adhesion to a very limited variety of substrates. In contrast, polyester polyols generally promote adhesion to more types of surfaces but are more susceptible to hydrolysis. Typically, a polyester molecule is hydrolyzed to an acid and alcohol as shown below. The hydrolysis may be acid or base catalyzed.

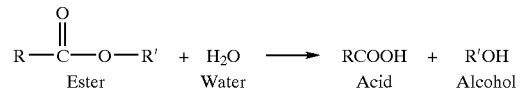

The deleterious consequence of such hydrolysis in a polyurethane material is the loss of desirable physical properties, as hydrolysis gives undesirable products with lower molecular weight.

In addition, polyester polyols are utilized in both foam and nonfoam formulations to improve physical properties such as toughness, tensile and flexural strength, durometer hardness, solvent resistance, and thermal properties. Urethane coatings, and other applications, based on polypropylene oxide polyols and toluene diisocyanate have found limited applications, i.e. indoors only, as also they contain contaminant ether linkages which are readily prone to oxidative degradation. CASE materials derived from polyester polyols, such as those prepared by the condensation of an aliphatic dicarboxylic acids and poly alcohols, are widely used indoors and outdoors. Their primary function in finished CASE materials has been to enhance abrasion resistance. While these CASE materials possess better durability than those based on polypropylene oxide polyols and toluene diisocyanate, they also contain ether groups that undergo oxidative degradation.

Aliphatic polyester polyols, which contain ether linkages and/or ester linkages have found wide spread use in CASE, as additives which can provide improved bonding and durability. These materials are generally based on caprolactone or adipic acid backbones. One of the more widely used commercial polyester polyols is based on polycaprolactone and sold under the trade name Tone® (Union Carbide Corp.). This polyester polyol is the product of the homopolymerization of caprolactone with a hydroxyl containing compound as an initiator, such as a diol, to form polycaprolactone polyols. These polyester polyol materials are hydrolytically stable, resistant to yellowing, display excellent abrasion, chemical and impact resistance, they provide excellent resistance to oxidative degradation, and are considered to be the leaders of the commercial products which are currently available. However, such materials are generally of high molecular weight (i.e., 1000 g/mol), they are solids at about 25° C. which require heating (to about 60° C.) prior to use and they are therefore generally more difficult to formulate with as compared to lower melting, lower viscosity polyols.

Aliphatic polyester polyols based on adipic acid are prepared by the condensation of adipic acid and a diol, such as 1,6-hexanediol, as shown below:

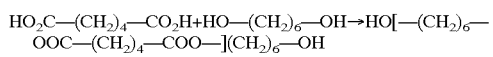

These materials are well known to undergo hydrolytic degradation at the ester linkage cites of the molecule. However, the materials have the advantage of a low manufacturing cost, as compared to Tone® type materials, which is favorable from a consumer point of view.

Polyester polyols derived from phthalic anhydride (PA) and low molecular weight diols are reported in U.S. Pat. No. 4,644,027 to Magnus et al., issued Feb. 17, 1987 and U.S. Pat. No. 4,644.047 to Wood, issued Feb. 17, 1987, for the production of cellular polyurethane and polyurethane/ polyisocyanates. Polyester polyols derived from PA and neopentyl glycol have been reported in U.S. Pat. No. 4,390,688 to Walz et al., issued Jun. 28, 1983. These materials are described as water dilutable polyesters with good resistance to xylene and dilute caustic solutions. PA polyester polyols have been used in polyurethane/polyisocyanurate rigid foams to impart low thermal conductivity, to lower cost and to lower blowing agent usage as reported in U.S. Pat. No. 4,791,148 to Riley et al., issued Dec. 13, 1988; U.S. Pat. No. 4,888,365 to Riley et al., issued Dec. 19, 1989 and U.S. Pat. No. 5,164,422 to Londrigan et al., issued Nov. 17, 1992. The PA based polyester polyols have been used in the preparation of urethane-modified isocyanurate foam as reported in U.S. Pat. No. 4,544,679 to Tideswell et al., issued Oct. 1, 1985.

Rigid foams have incorporated PA-based polyester polyols and perfluorinated hydrocarbons to enhance the thermal insulating properties of the foam as reported in U.S. Pat. No. 4,981,879 to Snider. issued Jan. 1, 1991 and EP 394736 A2, Snider et al., Oct. 31, 1990. The preparation of urethane prepolymers utilizing conventional polyester and polyether polyols is disclosed in U.S. Pat. No. 5,021,507 to Stanley et al., issued Jun. 4, 1991, and more recently in U.S. 5,863,980 to Choi et al., issued Jan. 26, 1999.

From a preparation perspective, the use of double metal cyanide catalysts in the manufacture of various polyols is well-established in the art. For example, U.S. Pat. No. 3,829,505, assigned to General Tire & Rubber Company, discloses the preparation of high molecular weight diols, diols etc., using these catalysts. The polyols prepared using these catalysts can be fabricated to have a higher molecular weight and a lower amount of end group unsaturation than can be prepared using commonly-used KOH catalysts. The '505 patent discloses that these high molecular weight polyol products are useful in the preparation of nonionic surface active agents, lubricants and coolants, textile sizes, packaging films, as well as in the preparation of solid or flexible polyurethanes by reaction with polyisocyanates. For other double metal cyanide catalyst usage in the polyol context, see for example, U.S. Pat. Nos. 4,985,491 (to Olin Corp., issued Jan. 15, 1991); and U.S. Pat. No. 4,77,589 (to Shell Oil Company, issued Oct. 16, 1984).

The polymerization of epoxides such as propylene oxide or mixtures of propylene oxide and ethylene oxide using water and/or alcohols as initiators is also of great industrial importance since the resulting polyether alcohols or polyether polyols are very versatile compounds which can be used as such or as intermediates In the manufacture of various products such as (flexible) polyurethanes, detergents, oil additives and brake fluids.

The polymerization of epoxides is normally carried out under basic conditions, i.e. by using potassium hydroxide or sodium hydroxide as a catalyst. Although products (polyether polyols or polyether alcohols) of good quality can be obtained, the use of these inorganic bases limits the capacity of the process since a long batch time is required to warrent good quality products. Shortening the batch times is not readily achievable by simply using more catalyst, as such increased usage would impose an unacceptable and significant increase in monetary costs. Shortening of the batch time is not however impossible, but it has the intrinsic disadvantage that the selectivity of the process is decreased substantially, which seriously affects the product properties.

Therefore, alternative catalytic systems allowing in principle a shorter batch time have already been proposed in the art. Reference is made in this respect to double metal cyanide complexes such as are disclosed in British Patent Specification No. 1,149,726 (for instance zinc hexacyano-metallate complexes also containing zinc chloride, water and an organic ligand) and in East German Patent Specification No. 148,957 (specifically metal hexacyano-iridium complexes also containing zinc chloride, water and an ether).

As mentioned above, both polyester-based and polyether-based polyols have their respective beneficial properties and drawbacks/limitations. Additionally, and perhaps most importantly, polyether and polyester polyols are generally not compatible with each other, i.e., they are often not readily soluble or miscible, and therefore are not readily capable of being employed as a mixture for use in any particular application. An ideal polyol would have the desirable properties exhibited by both ester- and ether-based polyols, with limited disadvantages of each previously mentioned. Additionally, and most importantly, there has been a long felt need for a polyol which can function as either a primary polyol or co-polyol in urethane and urethane prepolymer applications and/or compatibilize, i.e. solubilize, reduce viscosity, and make miscible, mixtures of conventional polyester and polyether polyols.

SUMMARY OF THE INVENTION

This invention relates to novel polyester-ether polyols and their use in preparing urethane prepolymers. Additionally, the invention relates to the use of such polyols and prepolymers in making urethane foams and non-foam urethane coatings, adhesives, sealants and/or elastomers. Methods for producing the polyester-ether polyols are disclosed using double metal cyanide complexes, along with methods for producing urethane prepolymers. It has been surprisingly discovered that the polyester-ether polyols of the instant invention possess highly desirable properties, such as reduced viscosity, improved ease of handling and are highly compatible with ester- and/or ether-based conventional polyols, i.e. they are generally soluble/miscible in either polyester- and/or polyether-based polyols.

The polyester-ether polyols are useful as either the primary polyols in urethane prepolymers, urethane foams and non-foam urethanes, or as a co-polyol in combination with auxiliary conventional ether- and/or ester-based polyols. Additionally, the polyester-ether polyols generally provide improved hydrolytic stability to CASE materials in which they are utilized.

It has been surprisingly discovered that the inventive polyester-ether polyols are soluble in and are compatible with other phthalic and/or non-phthalic anhydride based polyester polyols of similar molecular weights, such as caprolactone based polyester polyols, adipic acid based polyester polyols, terephthalate based polyester polyols, isophthalate based polyester polyols, and other aliphatic based polyester polyols. The polyester-ether polyols of the instant invention provide a unique combination of improved low viscosity and compatibility/compatibilization of polyester and polyether based polyols, which allows for the utilization of the conventional ether- and ester-based polyols in combination with each other. The polyester-ether polyols of the instant invention allow for the formation of stable and compatibilized mixtures of ester- and ether-based polyols which are usually immiscible.

DETAILED DESCRIPTION OF THE INVENTION

The polyester-ether polyols of the present invention are generally the reaction product of phthalic anhydride (PA), a polyhydroxyl compound, and an alkoxylating agent, e.g., propylene oxide, as shown below:

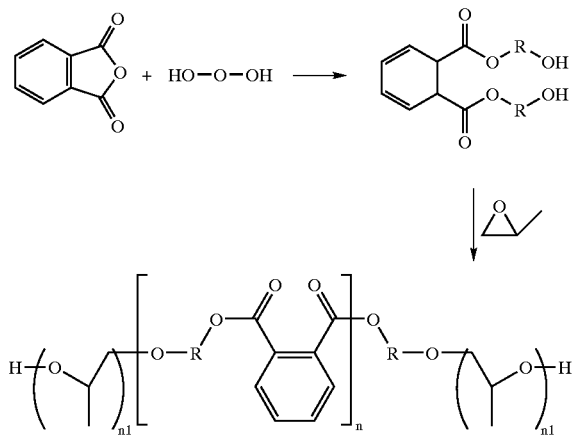

wherein R is branched or linear, saturated or unsaturated $C_{2-10}$ alkyl, cycloalkyl, alkenyl, alkynl, aromatic, polyoxyethylenic, polyoxypropylenic; wherein R may contain pendant secondary functionality such as hydroxyl, aldehyde, ketone, ether, ester, amide, nitrile, amine, nitro, thiol, sulfonate, sulfate, and/or carboxylic groups; n is typically 1–200 and each n1 is independently 1–200. Where pendant secondary hydroxyl functionality is present, such hydroxyl groups may optionally be alkoxylated. Preferably, phthalic anhydride is reacted with a polyol, i.e., a diol such as diethylene glycol to form an intermediate polyester polyol.

The intermediate polyester polyol is then reacted with an alkoxylating agent, such as propylene oxide, to form the polyester-ether polyol. Although traditional catalysts, such as sodium hydroxide have proven useful to effectuate the alkoxylation, it has been surprisingly discovered that the alkoxylation reaction can be more efficiently conducted using a double metal cyanide catalyst. Without wishing to be bound by any particular theory, it is speculated that unsaturated end groups result in monofunctional species that act as chain stoppers/terminators in elastomer/polymer formation, whereby such formation is highly undesirable. In typical polyol synthesis with KOH catalysis the unsaturation formed increases as a direct function of equivalent weight. Eventually conditions are established wherein further alkylene oxide, e.g., propylene oxide, addition fails to increase the molecular weight. In other words the use of alkali catalysts to produce high molecular weight, hydroxy terminated polyoxypropylene ethers typically results in a substantial loss in hydroxy functionality. It has been discovered that with double metal cyanide catalysis much less unsaturation is formed allowing higher equivalent weight polyester ether polyols to be prepared.

The double metal cyanide complex class catalysts suitable for use herein and their preparation are described in U.S. Pat. Nos. 4,472,560 and 4,477,589 to Shell Chemical Company and U.S. Pat. Nos. 3,941,849 and 4,335,188 to General Tire & Rubber Company. The teachings of the foregoing patents are incorporated herein by reference.

One class of double metal cyanide complex catalysts found particularly suitable for use herein is are zinc hexacyanometallates of the general formula:

$$Zn_3[M(CN)_6]_2 \cdot xZnCl_2 \cdot yGLYME \cdot zH_2O$$

wherein M may be Co(III), or Cr(III) or Fe(II) or Fe(III); x, y, and z may be fractional numbers, integers, or zero and vary depending on the exact method of preparation of the complex. Also useful is a zinc hexacyanometallates of the general formula:

$$Zn_2[M(CN)_8] \cdot xHCl \cdot yGLYME \cdot zH_2O$$

wherein M is defined as above.

A highly preferred double metal cyanide complex catalyst found particularly suitable for use is a zinc hexacyanometallate of formula:

$$Zn_2[Co(CN)_8]Cl \cdot 0.5HCl \cdot DME \cdot 2.75H_2O$$

as described in J. Catal (105) 163–174, 1987 by Kuyper and Boxhoom, including its preparation, incorporated herein by reference in its entirety.

Other suitable catalysts include general formula:

$$M_a^1[M^2(CN)_b(A)_c]_d \cdot wM^3D_e \cdot xH_2O \cdot yL \cdot zH_nE_m$$

wherein $M^1$ represents at least one of Zn(II), Fe(II), Co(II), Ni(II), Mn(II), Cu(II), Sn(II) or Pb(II); $M^2$ represents at least one of Fe(II), Fe(III), Co(III), Cr(III), Mn(II), Mn(III), Ir(III), Rh(III), Ru(II), V(IV) or V(V); $M^3$ represents $M^1$ and/or $M^2$; A, D and E each represent an anion which may be the same or different; L represents an alcohol, aldehyde, acetone, ether, ester, amide, nitrile or sulphide or mixtures thereof; a and d are numbers to satisfy the valency state of $M^1$ and $M^2$ in the double metal cyanide part of the general formula I; b and c are integers (b>c) which together with a and d provide the electroneutrality of the double metal cyanide part of the general formula I; e is an integer satisfying the valency state of M3; n and m are integers satisfying the electroneutrality of HE, and w is a number between 0.1 and 4; x is a number up to 20; y is a number between 0.1 and 6, and z is a number between 0.1 and 5.

Other useful catalysts include zinc hexacyano cobaltates according to the general formula:

$$Zn_3[Co(CN)_6]_2 \cdot wM^3X_2 \cdot xH_2O \cdot yL \cdot zHX$$

wherein X represents a halide; $M^3$ represents Zn(II), Co(II) or Fe(II); L represents an alcohol, ether or ester and w is a number between 0.7 and 1.5; x is a number between 2 and 10; y is a number between 1.5 and 3, and z is a number between 0.15 and 1.5.

In accordance with this formula and the above formula, L can be an alcohol, aldehyde, ketone, ether, ester, amide, nitrile or sulphide. Examples of alcohols include lower alcohols such as methanol, ethanol, propanol, isopropanol and butanol. Higher alcohols as well as alcohols containing aromatic rings can also be used. Examples of aldehydes include formaldehyde, acetaldehyde, butyraldehyde, pivalaldehyde, glyoxal, benzaldehyde and cinnamic aldehyde. Examples of ketones include acetone, methyl ethyl ketone, methyl isobutyl ketone, diethyl ketone and cyclohexanone. Examples of ethers include monoethers, diethers and polyethers as well as cyclic ethers such as dimethyl ether, diethyl ether, dibutyl ether, methyl t-butyl ether, bis-(beta-methoxy ethyl) ether, ethylene glycol dimethyl ether, triethylene glycol dimethyl ether, dimethoxy methane, diethoxy methane, acetal, trimethylol propane trimethyl ether, dioxane, trioxyethylene and paraldehyde. Preference is given to the use of acyclic ethers, in particular acyclic diethers such as dimethoxy ethane (ethylene glycol dimethyl ether). Also hydroxy ethers such as ethylene glycol monomethyl ether and related compounds can be used conveniently. Examples of esters include methyl formate, ethyl formate isopropyl formate, methyl acetate, ethyl acetate, propyl acetate, ethylene glycol diacetate and triethylene glycol diacetate. Examples of amides include formamide, acetamide, propionamide, valeramide as well as urea and derivatives thereof. Examples of nitriles include acetonitrile, propionitrile and valeronitrile. Examples of sulphides include dimethyl sulphide, diethyl sulphide and ethyl butyl sulphide. Also mixtures of two or more organic compounds can be applied.

The acids according to the general formula $H_nE_m$ which are present in the double metal cyanides comprise hydrochloric acid, hydrobromic acid, hydroiodic acid, nitric acid, sulphuric acid, phosphoric acid, (per)chloric acid, carboxylic acids such as acetic acid and benzoic acid, halogen-substituted carboxylic acids such as trichloro acetic acid and trifluoro acetic acid, alkyl sulphonic acids and aryl sulphonic acids such as methane sulphonic acid and para-toluene sulphonic acid. Preference is given to the hydrogen halides and sulphuric acid, and particularly hydrogen chloride and hydrogen bromide. Mixtures of acids can also be used suitably.

The present invention relates to a process for the preparation of polyester-ether polyols which comprises alkoxylating at least one polyester polyol compound in the presence of at least one alkoxylating agent, in the presence of at least one double metal cyanide complex catalyst as disclosed above. The present invention further relates to the polyester-ether polyols produced by the above process.

While a wide variety of polyhydridic alcohols may be utilized in the present invention to prepare the intermediate polyester polyols, preferred PA polyester polyol intermediates are of the form

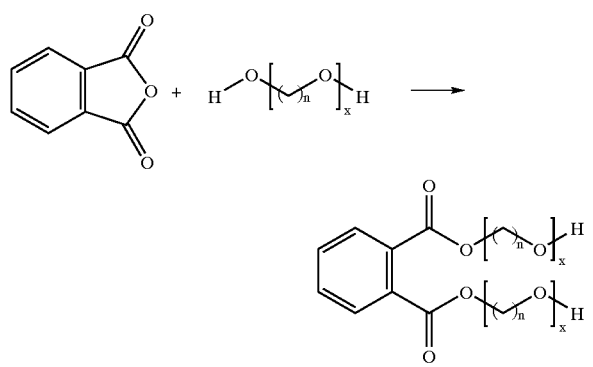

wherein n=2–10, x=1–500. Highly preferred PA polyester polyol intermediates for use in the present invention are derived from the condensation of phthalic anhydride and ethylene glycol, diethylene glycol, propylene glycol, dipropylene glycol, neopentyl glycol, 1,4-butanediol, 1,6-hexanediol, polyethylene glycol, polypropylene glycol triethylene glycol, and tetramethylene glycol and mixtures thereof.

Alkoxylating agents useful herein include any agent capable of providing a sufficient amount of ether moieties to the final polyester-ether polyol. Preferred alkoxylating agents are ethylene oxide, propylene oxide, butylene oxide, or mixtures thereof.

The phthalic anhydride based polyester-ether polyols are compatible with standard foam flowing and formation techniques and are also compatible with atmospheric curing, heat curing, and exhibit normal pigmentation compatibility.

The invention encompasses polyester-ether polyols, methods for preparing such polyols, and their use in preparing urethane prepolymers, urethane foams and non-foam urethane coatings, adhesives, sealants and/or elastomers. The polyester-ether polyols of the instant invention are preferably the reaction product of phthalic anhydride or phthalic acid, a diol, and an alkoxylating agent, wherein the phthalic anhydride or phthalic acid and the diol are first reacted to from an intermediate polyester polyol, which is subsequently reacted with an alkoxylating agent (e.g., propylene oxide), to give a polyester-ether polyol. Although the polyester-ether polyols of the instant invention are useful as the primary polyols in the preparation of urethane prepolymers, urethane foams and CASE materials, they are primarily and preferably useful as compatibilizing polyols in combination with polyester and/or polyether polyols.

Accordingly, the instant invention encompasses a composition suitable for preparing urethane prepolymers and/or urethane foams or non-foam urethane coatings, adhesives, sealants and/or elastomers, comprising:

(a) from about 0% to about 5.0% based on the weight of the composition of a urethane catalyst;

(b) from about 10% to about 90% based on the weight of the composition of a phthalate polyester-ether polyol which is the reaction product of:

(1) about 2–60% based on the weight of the polyester-ether polyol of phthalic anhydride or phthalic acid; and (2) about 40–98% based on the weight of the polyester-ether polyol of at least one polyol of the formula:

$$HO-R_1-OH$$

wherein $R_1$ represents:
(a) alkylene groups of about 2 to 10 carbon atoms;
(b) $-CH_2-R_2CH_2-$
where $R_2$ represents:

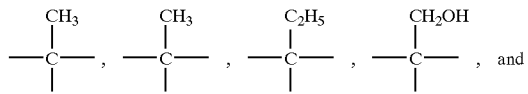

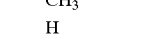

(c) $-(R_3O)_{n2}-R_3-$
where each $R_3$ independently is an alkylene group of about 2 to about 4 carbon atoms, and n2 is an integer of from about 1–200; and (3) about 10–80% based on the weight of the polyester-ether polyol of an alkoxylating agent;

(c) from about 0–50 percent by weight of an auxiliary polyether polyol, polyester polyol, to or a mixture thereof;

(d) from about 0% to about 10% based on the weight of the composition of a blowing agent; and (e) from about 0% to about 5% based on the weight of the composition of a compatibilizing surfactant.

The $R_1$ alkylene groups may be branched or straight chain, saturated or unsaturated, and when $R_2$ contains a hydroxyl moiety, such hydroxyl group may be optionally alkoxylated. The polyester-ether polyol is preferably the reaction product of phthalic anhydride or phthalic acid, the polyol, and the alkoxylating agent, wherein the phthalic anhydride or phthalic acid and the polyol are first reacted to from an intermediate polyester polyol, which is subsequently reacted with the alkoxylating agent to give the polyester-ether polyol.

The instant invention further encompasses a composition suitable for preparing urethane prepolymers and/or urethane foams or non-foam urethane coatings, adhesives, sealants and/or elastomers, comprising:

(a) from about 10% to about 60% based on the weight of the composition of an isocyanate;

(b) from about 50% to about 90% based on the weight of the composition of a phthalate polyester-ether polyol which is the reaction product of:
  (1) about 2–60% based on the weight of the polyester-ether polyol of phthalic anhydride or phthalic acid; and
  (2) about 40–98% based on the weight of the polyester-ether polyol of at least one polyol of the formula:

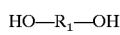

wherein $R_1$ represents:
  (a) alkylene groups of about 2 to 10 carbon atoms;
  (b) —$CH_2$—$R_2$—$CH_2$—
  where $R_2$ represents:

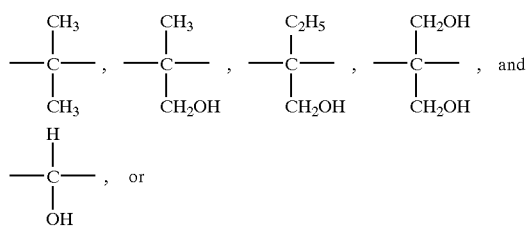

(c) —$(R_3O)_{n2}$—$R_3$—
    where each $R_3$ independently is an alkylene group of about 2 to about 4 carbon atoms, and n2 is an integer of from about 1–200; and
  (3) about 10–80% based on the weight of the polyester-ether polyol of an alkoxylating agent.

(c) from about 0–50% based on the weight of the composition of an auxiliary polyether polyol, polyester polyol, or a mixture thereof;

(d) from about 0% to about 10% based on the weight of the composition of a blowing agent; and (e) from about 0% to about 5% based on the weight of the composition of a compatibilizing surfactant.

The R alkylene groups ray be branched or straight chain, saturated or unsaturated, and when $R_2$ contains a hydroxyl moiety, such hydroxyl group may be optionally alkoxylated. The polyester-ether polyol is preferably the reaction product of phthalic anhydride or phthalic acid, the polyol, and the alkoxylating agent, wherein the phthalic anhydride or phthalic acid and the polyol are first reacted to from an intermediate polyester polyol, which is subsequently reacted with the alkoxylating agent to give the polyester-ether polyol.

Most commonly when a urethane prepolymer is desired, it is prepared by condensation polymerization, i.e., the isocyanate with the polyol(s), most preferably the polymerization of a diisocyanate with a diol. A prepolymer is generally defined as a non-stoichiometric reaction product of an isocyanate and a polyol. The urethane prepolymers may also be prepared by polymerizing the compositions disclosed herein in the presence of an optional polyamino or a polymercapto-containing compound such as diamino polypropylene glycol or diamino polyethylene glycol or polythioethers such as the condensation products of thiodiglycol either alone or in combination with other glycols such as ethylene glycol, 1,2-propylene glycol or with other polyhydroxy compounds disclosed herein. Also, small amounts of low molecular weight dihydroxy, diamino, or amino hydroxy compounds may be used such as saturated and unsaturated glycols e.g. ethylene glycol or condensates thereof such as diethylene glycol, triethylene glycol, and the like; ethylene diamine, hexamethylene diamine and the like; ethanolamine, propanolamine, N-methyldiethanolamine and the like. Typically for the preparation of urethane prepolymers, the isocyanate, polyol(s), and other components are combined in proportions so as to yield a urethane prepolymer characterized by an isocyanate content of from about 0.25 to about 25%, preferably to about 1 to 10%, and most preferably from 1.5 to 5%. In addition, the ratio of isocyanate equivalents to hydroxyl, amino or mercapto equivalents (known as the isocyanate index) should be greater than 1 but no more than about 2 for prepolymer preparation. The precise amount of the isocyanate used in the polymerization will depend on the equivalent weight and amount of the non-isocyanate components, and the particular isocyanate employed. In general, the amount of the isocyanate needed to achieve the isocyanate content will vary from about 5 to about 55% of the final prepolymer.

The invention further encompasses a composition suitable for preparing urethane prepolymers and/or urethane foams or non-foam urethane coatings, adhesives, sealants and/or elastomers, comprising:

(a) from about 10% to about 70% based on the weight of the composition of an isocyanate;

(b) from about 0.02% to about 5.0% based on the weight of the composition of a urethane catalyst; and (c) from about 50% lo about 90% based on the weight of the composition of a phthalate polyester-ether polyol which is the reaction product of:
  (1) about 2–60% based on the weight of the polyester-ether polyol of phthalic anhydride or phthalic acid; and
  (2) about 40–98% based on the weight of the polyester-ether polyol of at least one polyol of the formula:

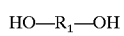

wherein $R_1$ represents:
  (a) alkylene groups of about 2 to 10 carbon atoms;
  (b) —$CH_2$—$R_2$—$CH_2$—
  where $R_2$ represents:

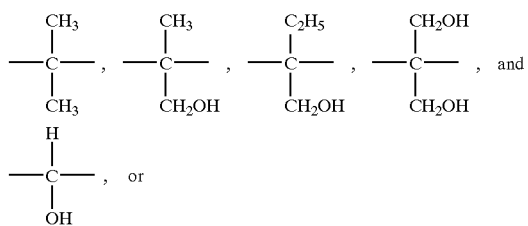

(c) —$(R_3O)_{n2}$—$R_3$—
    where each $R_3$ independently is an alkylene group of about 2 to about 4 carbon atoms, and n2 is an integer of from about 1–200; and
  (3) about 10–80% based on the weight of the polyester-ether polyol of an alkoxylating agent selected from the group consisting essentially of ethylene oxide, propylene oxide or butylene oxide or mixtures thereof;

(d) from about 0–50% based on the weight of the composition of an auxiliary polyether polyol, polyester polyol, or a mixture thereof.

(e) from about 0% to about 10% based on the weight of the composition of a blowing agent; and (f) from about 0% to about 5% based on the weight of the composition of a compatibilizing surfactant The $R_1$ alkylene groups may be branched or straight chain, saturated or unsaturated, and when $R_2$ contains a hydroxyl moiety, such hydroxyl group may be optionally alkoxylated. The polyester-ether polyol is preferably the reaction product of phthalic anhydride or phthalic add, the polyol, and the alkoxylating agent, wherein the phthalic anhydride or phthalic acid and the polyol are first reacted to from an intermediate polyester polyol, which is subsequently reacted with the alkoxylating agent to give the polyester-ether polyol.

In a more preferred embodiment the compositions suitable for preparing urethane prepolymer and/or urethane foams and non-foam urethane coatings, adhesives, sealants and/or etastomers will comprise from about 10–40%, most preferably from about 10–30% of the isocyanate when present; from about 0.5–4.0%, most preferably from about 0.5–3.0% of the urethane catalyst when present; from about 50–80%, most preferably from about 50–70% of the phthalate polyester-ether polyol, wherein the phthalate polyester-ether polyol preferably comprises from about 10–60%, most preferably 20–50% of phthalic acid or phthalic anhydride; preferably from about 40–80% of the polyol; and preferably from about 10–50% of the alkoxylating agent. In highly preferred embodiments, the alkoxylating agent is propylene oxide and is present in about 50–60% by weight, based on the intermediate polyester polyol. In a more preferred embodiment the urethane prepolymers and/or urethane compositions will comprise from about from about 5–40%, most preferably from about 10–30% of the auxiliary polyether polyol, polyester polyol, or a mixture thereof.

The compositions disclosed herein may be substantially free of CFC and/or hydrocarbon blowing agents (i.e. they contain less than 1% by weight of a blowing agent) and are suited for use in non-foam applications, i.e., CASE. Alternatively, the compositions of the present invention may optionally contain CFC and/or hydrocarbon blowing agents and be suited for use in foam applications, i.e., open and closed cell foams. Optionally, the composition disclosed herein may additionally contain from about 0.01–20.0% by weight of a polyisocyanurate.

In a preferred embodiment, the alkoxylating agent is propylene oxide. Highly preferred isocyanates are 2,4- and/or 2,4/2,6-toluene diisocyanate, diphenyl methane 4,4'-diisocyanate, hexamethylene diisocyanate, isophorone diisocyanate, or mixtures thereof. Highly preferred urethane catalysts are tetramethylbutanediamine (TMBDA), 1,4-diaza(2,2,2)bicyclooctane (DABCO), dibutyltindilaurate (DBTDL) tinoctoate (SnOct), dimorpholine diethylether (DMDEE), or mixtures thereof.

A preferred polyester-ether polyol for use in the above and below described compositions has the formula:

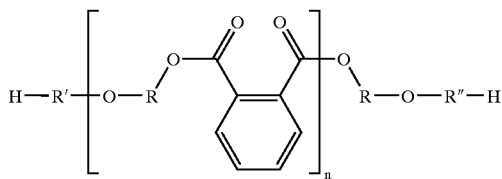

wherein R represents:
(a) alkylene groups of about 2 to 10 carbon atoms;
(b) —$CH_2$—$R_2$—$CH_2$— where $R_2$ represents:

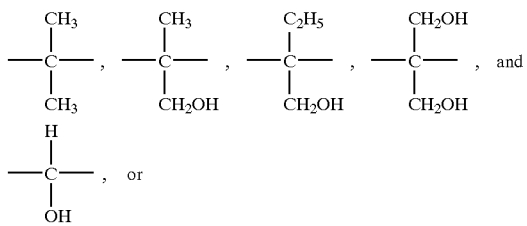

(c) —$(R_3O)_{n2}$—$R_3$—
where each $R_3$ independently is an alkylene group of about 2 to about 4 carbon atoms, and
n2 is an integer of from about 1–200; and
wherein R' and R'' are independently —$[CH_2CH_2O]_{n1}$—, —$[CH_2CH(CH_3)O]_{n1}$—, —$[CH_2CH_2CH(CH_3)O]_{n1}$—, or a random combination thereof, where n1 is independently 1–200 for R' and R''; and wherein n is 1–200.
The R alkylene groups may be branched or straight chain, saturated or unsaturated, and when $R_2$ contains a hydroxyl moiety, such hydroxyl group may be optionally alkoxylated.

A highly preferred polyester-ether polyol has the formula

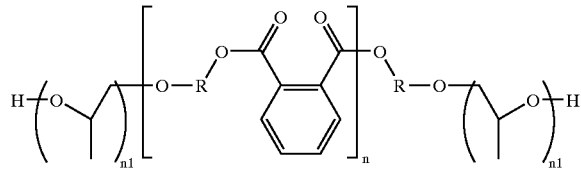

wherein R represents:
(a) alkylene groups of about 2 to 10 carbon atoms;
(b) —$CH_2$—$R_2$—$CH_2$—
where $R_2$ represents:

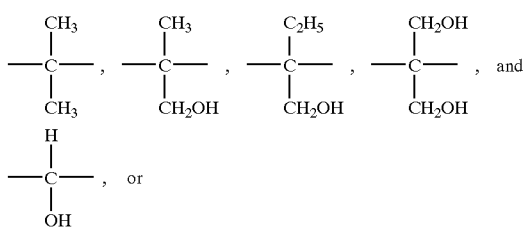

(c) —$(R_3O)_{n2}$—$R_3$—
where each R3 independently is an alkylene group of about 2 to about 4 carbon atoms, and
n2 is an integer of from about 1–200; and
where n1 is independently 1–200; and wherein n is 1–200.
The R alkylene groups may be branched or straight chain, saturated or unsaturated, and when $R_2$ contains a hydroxyl moiety, such hydroxyl group may be optionally alkoxylated.

A most preferred polyester-ether polyol has the formula

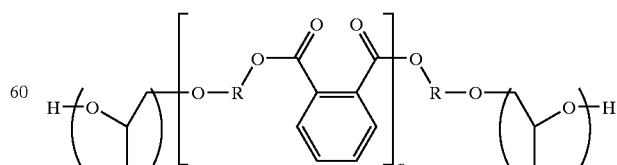

wherein each R is —$(CH_2CH_2OCH_2CH_2)$—; wherein each n1 is independently 1–200; and
wherein n=1–200.

Specific auxiliary polyester polyols suitable for use in the compositions of the invention include for example phthalic acid diethylene glycol polyester polyols. Suitable auxiliary phthalic add diethylene glycol polyester polyols are commercially available from Stepan Company, Northfield, Ill. Representative auxiliary polyols are, StepanPol® PS-2002 (a phthalic anhydride diethylene glycol polyester polyol having an OHv of 195 and a functionality of 2), StepanPol® PS-3152 (a phthalic anhydride diethylene glycol polyester polyol having an OHv of 315 and a functionality of 2), and StepanPol® PS4002 (a phthalic anhydride diethylene glycol polyester polyol having an OHv of 400 and a functionality of 2), and mixtures thereof. In the instant invention, by OH value (OHv) is meant hydroxyl value, a quantitative measure of the concentration of hydroxyl groups, usually stated as mg KOH/g, i.e., the number of milligrams of potassium hydroxide equivalent to the hydroxyl groups in 1 g of substance. By functionality is meant the number of reactive groups. e.g., hydroxyl groups, in a chemical molecule.

Other auxiliary polyester polyols, i.e. non-phthalic anhydride-based polyester polyols, include for example, polyester polyols derived from the condensation of caprolactone and a poly alcohol. Specific auxiliary polyether polyols suitable for use in the methods and compositions of the invention include for example the condensation products of propylene glycolpropylene oxid/e, trimethytolpropanelethylene oxide/propylene oxide, trimethylolpropane/propylene oxide, sucrose/propylene glycol/propylene oxide, alkylamine/propylene oxide, and glycerin/propylene oxide, and mixtures thereof.

Although not critical to the present invention, the compositions of the present Invention may optionally contain from about 0.01–50.0 percent by weight of a cross linking agent. Suitable cross linking agents are, for example, higher functionality alcohols such as triols or pentaerythitol.

A wide variety of urethane catalysts are suitable for use in the present invention. Generally, any urethane catalyst capable of effecting a polymerization to form a urethane CASE may be used in the present invention. Examples of suitable urethane catalysts include, among others, tetramethylbutanediamine (TMBDA), 1,4-diaza(2,2,2) bicyclooctane (DABCO), dibutyltindilaurate (DBTDL) and tinoctoate (SnOct), and mixtures thereof.

Isocyanates useful in the present invention, include among others for example, polyisocyanates, aliphatic, cycloaliphatic, araliphatic, aromatic and heterocyclic polyisocyanates, such as those described, for example, by W. Siefken in Justus Liebigs Annalen der Chemie 562: 75–136. Examples include ethylene diisocyanate; tetramethylene-1, 4diisocyanate, hexamethylene-1,6-diisocyanate; dodecane-1,12-diisocyanate; cyclobutane-1,3diisocyanate; cyclohexane-1,3- and 1,4-diisocyanate and mixtures of these isomers; 1-isocyanato-3,3,5-trimethyl-5-isocyanatomethylcyclohexane (German Auslegeschrift No. 1, 202,785, U.S. Pat. No. 3,401,190); hexahydrotolylene-2, 4- and 2,6-diisocyanate and mixtures of these isomers; hexahydrophenylene-1,3- and/or -1,4-diisocyanate; perhydrodiphenylmethane-2,4'- and/or 4,4'-diisocyanate; phenylene-1,3- and -1,4-diisocyanate; tolulene-2,4- and -2,6-diisocyanate and mixtures of these isomers; diphenylmethane-2,4'- and/or -4,4'-diisocyanate; naphthylene-1,5-diisocyanate; triphenyl methane-4,4',4"-triisocyanate; polyphenyl-polymethylene polyisocyanate which may be obtained by aniline/formaldehyde condensation followed by phosgenation and which have been described, for example, in British Pat. Nos. 874,430 and 848,671; m- and p-isocyanatophenyl sulphonyl isocyanate according to U.S. Pat. No. 3,454,606; perchlorinated aryl polyisocyanate as described, for example, in U.S. Pat. No. 3,277,138; polyisocyanate; containing carbodiimide groups as described in U.S. Pat. No. 3,152,162; the diisocyanates described in U.S. Pat. No. 3,492,330; polyisocyanates containing allophanate groups as described, for example, in British Pat. No. 994,890, Belgian Pat. No. 761, 626 and Published Dutch Patent application No. 7,102,524; polyisocyanates containing isocyanurate groups as described, for example, in U.S. Pat. No. 3,001,973, in German Pat. Nos. 1,022,789; 1,222,067 and 1,027,394 and in German Offenlegungsschriften Nos. 1,929,034 and 2,004,048; polyisocyanates containing urethane groups as described, for example, in Belgian Pat. No. 752,261 or in U.S. Pat. No. 3,394,164; polyisocyanates containing acrylated urea groups according to German Pat. No. 1,230,778; polyisocyanates containing biuret groups as described, for example, in U.S. Pat. Nos. 3,124,605 and 3,201,372; and in British Pat. No. 889,050; polyisocyanates prepared by telomerization reactions as described, for example in U.S. Pat. No. 3,654,016; polyisocyanates containing ester groups as mentioned, for example, in British Pat. Nos. 965,474 and 1,072,956, in U.S. Pat. No. 3,567,763 and in German Pat. No. 1,231,688; reaction products of the above-mentioned isocyanates with acetals according to German Pat. No. 1,072,385; and, polyisocyanates containing polymeric fatty acid groups as described in U.S. Pat. No. 3,455,883, and mixtures thereof.

The distillation residues obtained from the commercial production of isocyanates and which still contain isocyanate groups may also be used, optionally dissolved in one or more of the above-mentioned polyisocyanates.

Other suitable polyisocyanates which are readily available include, for example, toluene-2,4- and -2,6-diisocyanate and mixtures of these isomers ("TDI"); polyphenyl polymethylene polyisocyanates which may be obtained by aniline/formaldehyde condensation followed by phosgenation ("crude MDI"); and, polyisocyanates containing carbodiimide groups, urethane groups, 25 allophanate groups, isocyanurate groups, urea groups or biuret groups ("modified polyisocyanates"), and mixtures thereof.

Somewhat more preferred polyisocyanates are 2,4- and/or 2,4/2,6-toluene diisocyanate, diphenyl methane 4,4'-diisocyanate, hexamethylene diisocyanate, and isophorone diisocyanate, and mixtures thereof.

Suitable polyisocyanurates useful in the present invention also include, as is well known to those skilled in the art, the cyclotrimerization product of any of the aforementioned polyisocyanates.

Compositions of the present invention may contain optional ingredients, including for example, rheology modifiers, plasticizers, pigments, and waxes.

Another embodiment of the present invention includes a novel polyester-ether polyol for use in preparing urethane prepolymers, urethane foams and non-urethane coatings, sealants, adhesives and/or elastomers of the formula:

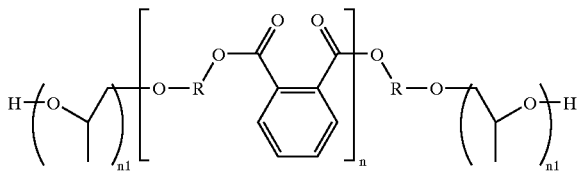

wherein R represents:
(a) alkylene groups of about 2 to 10 carbon atoms;
(b) —$CH_2$—$R_2$—$CH_2$—
where $R_2$ represents:

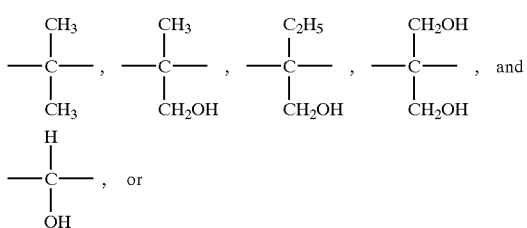

(c) —(R$_3$O)$_{n2}$—R$_3$—
where each R$_3$ independently is an alkylene group of about 2 to about 4 carbon atoms, and
n2 is an integer of from about 1–200; and
where n1 is independently 1–200; and
wherein n is 1–200.

The R alkylene groups may be branched or straight chain, saturated or unsaturated, and when R$_2$ contains a hydroxyl moiety, such hydroxyl group may be optionally alkoxylated.

Another embodiment of the present invention includes a novel polyester-ether polyol for use in preparing urethane prepolymers, urethane foams and non-urethane coatings, sealants, adhesives and/or elastomers of the formula:

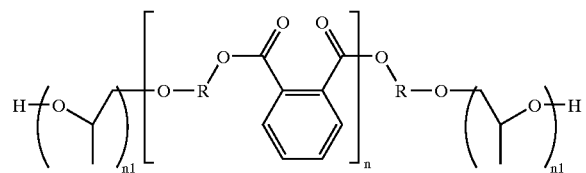

wherein each R is —(CH$_2$CH$_2$OCH$_2$CH$_2$)—; wherein each n1 is independently 1–200; and
wherein n=1–200.

The instant invention further includes methods for preparing a phthalate polyester-ether polyol comprising combining:

a) about 2–60% based on the weight of phthalate polyester-ether polyol of phthalic anhydride or phthalic acid; and b) about 40–98% based on the weight of phthalate polyester-ether polyol of at least one polyol of the formula:

HO—R$_1$—OH wherein R$_1$ represents:
(a) alkylene groups of about 2 to 10 carbon atoms;
(b) —CH$_2$—R$_2$—CH2—
where R$_2$ represents:

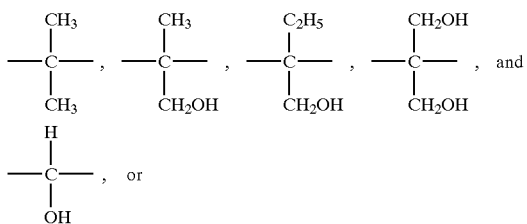

(c) —(R$_3$O)$_{n2}$—R$_3$—
where each R$_3$ independently is an alkylene group of about 2 to about 4 carbon atoms, and n2 is an integer of from about 1–200, to form an intermediate polyester-polyol; and alkoxylating said intermediate polyester polyol with about 10–80% based on the weight of the phthalate polyester-ether polyol of an alkoxylating agent to form the polyester-ether polyol. The R$_1$ alkylene groups may be branched or straight chain, saturated or unsaturated, and when R$_2$ contains a hydroxyl moiety, such hydroxyl group may be optionally alkoxylated. Further in accordance with this method embodiment, the alkoxylation may be conducted in the presence of a double metal cyanide complex catalyst. The double metal cyanide complex catalyst may be of the formula

M$_8^1$[M$^2$(CN)$_b$(A)$_c$]$_d$·wM$^3$D$_e$·xH$_2$O·yL·zH$_n$E$_m$ wherein M$^1$ represents at least one of Zn(II), Fe(II), Co(II), Ni(II), Mn(II), Cu(II), Sn(II) or Pb(II); M$^2$ represents at least one of Fe(II), Fe(III), Co(III), Cr(III), Mn(II), Mn(III), Ir(III), Rh(III), Ru(II), V(IV) or V(V); M$^3$ represents M$^1$ and/or M$^2$; A, D and E each represent an anion which may be the same or different; L represents an alcohol, aldehyde, acetone, ether, ester, amide, nitrile or sulphide or mixtures thereof; a and d are numbers to satisfy the valency state of M$^1$ and M$^2$ in the double metal cyanide part of the general formula I; b and c are integers (b>c) which together with a and d provide the electroneutrality of the double metal cyanide part of the general formula I; e is an integer satisfying the valency state of M$^3$; n and m are integers satisfying the electroneutrality of HE, and w is a number between 0.1 and 4; x is a number up to 20; y is a number between 0.1 and 6, and z is a number between 0.1 and 5. Alternatively, the double metal cyanide complex catalyst may be of the formula

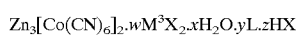
Zn$_3$[Co(CN)$_6$]$_2$·wM$^3$X$_2$·xH$_2$O·yL·zHX wherein X represents a halide; M$^3$ represents Zn(II), Co(II) or Fe(II); L represents an alcohol, ether or ester and w is a number between 0.7 and 1.5; x is a number between 2 and 10; y is a number between 1.5 and 3, and z is a number between 0.15 and 1.5. In yet another embodiment, the double metal cyanide complex catalyst is of the formula

Zn$_2$[Co(CN)$_6$]Cl-0.5HCl-DME-2.75H$_2$O.

Combinations of the various metal catalysts may optionally be used. Additionally, the invention relates to a polyester-ether polyols produced by the above methods using the metal catalysts disclosed.

The instant invention further includes methods for preparing urethane prepolymers, urethane foams and non-foam urethane coatings, adhesives, sealants and/or elastomers, comprising combining:

(a) from about 10% to about 60% based on the weight of the composition of an isocyanate;

(b) from about 0.02% to about 5.0% based on the weight of the composition of a urethane catalyst; and (c) from about 50% to about 90% based on the weight of the composition of a phthalate polyester-ether polyol which is the reaction product of:

(1) about 2–60% based on the weight of phthalate polyester-ether polyol of phthalic anhydride or phthalic acid: and (2) about 40–98% based on the weight of phthalate polyester-ether polyol of at least one polyol of the formula:

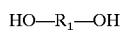
HO—R$_1$—OH wherein R$_1$ represents:
(a) alkylene groups of about 2 to 10 carbon atoms;

(b) —CH$_2$—R$_2$—CH$_s$—
where R$_2$ represents:

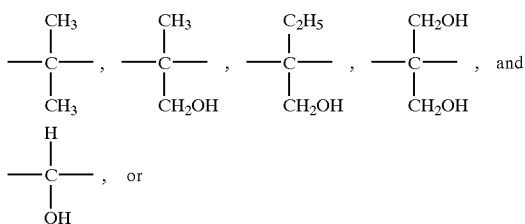

(c) —(R$_3$O)$_{n2}$—R$_3$—
where each R$_3$ independently is an alkylene group of about 2 to about 4 carbon atoms, and n2 is an integer of from about 1–200; and (3) about 10–80% based on the weight of phthalate polyester-ether polyol of an alkoxylating agent; and (d) from about 0–50% based on the weight of the composition of an auxiliary polyether polyol, polyester polyol, or a mixture thereof;

(e) from about 0% to about 10% based on the weight of the composition of a blowing agent;

(f) from about 0% to about 5% based on the weight of the composition of a compatibilizing surfactant, to form a mixture; and reacting/polymerizing the mixture to form a urethane prepolymer, urethane foam or non-foam urethane coating, adhesive, sealant and/or elastomer. The polyester-ether polyol is preferably the reaction product of phthalic anhydride or phthalic acid, the polyol, and the alkoxylating agent, wherein the phthalic anhydride or phthalic acid and the polyol are first reacted to from an intermediate polyester polyol, which is subsequently reacted with the alkoxylating agent to give the polyester-ether polyol.

Another embodiment of the present invention includes urethane prepolymers, urethane foams and non-foam urethanes suitable for use in a coatings, adhesives, sealants and/or elastomers which are made from polymerizing the compositions suitable for preparing such materials as described herein.

The merits of this invention are further supported by the following non-limiting and illustrative examples.

EXAMPLES

As used in the Examples and description appearing below, the following designations, symbols, terms and abbreviations have the indicated meanings:

| Material | Description |
| --- | --- |
| STEPANPOL ® PS-2002 | ~200 OHv; phthalic anhyride/diethylyene glycol polyester; Acid Number = 0.64 |
| TONE 0201 | ~200 OHv; polycaprolactone glycol; Acid Number = 0.13 |
| Formrez ® 11-225 | ~200 OHv; diethylene glycol/adipic acid polyester glycol |
| "Liquid" MDI | methylene-diphenylene isocyanate |
| Voranol 220-056N | The product of propoxylation of propylene glycol to an approximate hydroxyl value of 56.1 mg KOH/g. Residual potassium, the catalyst for the propoxylation at ca., 0.2% by weight of the final product, is typically removed by adsorption of potassium on magnesium silicate which is in turn removed from the product by filtration. About 50 ppm (parts per million) of phosphoric acid are then added to the final polypropylene glycol to assure the product is not basic. |
| Voranol 220-110 | Voranol 220-110N with no addition of phosphoric acid |
| Magnesol | Magnesium silicate; manufactured by the Dallas Group of Indiana; a hydrated, synthetic, amorphous magnesium silicate with a porous structure and active surface that imparts high performance, selective, and sorptive properties; its highly active surface attracts sodium, potassium, and other metal ions as well as other polar compounds by chemisorption and holds them for removal from the process by filtration |

In the following examples, all amounts are stated in percent by weight of active material unless indicated otherwise. One skilled in the art will recognize that modifications may be made in the present invention without deviating from the spirit or scope of the invention. The invention is illustrated by the examples contained within; such examples are not to be construed as limiting the invention or scope of the specific procedures or compositions described herein.

The following raw materials in Table I were used without purification in the examples which follow (abbreviations used are PA=phthalic anhydride, DEG=diethylene glycol, PPG=polypropylene glycol, PPO=polypropylene oxide, Gyl=glycerin, Su=sucrose, OHv=hydroxyl value in mg KOH/g). Polyols A and B are commercially available polyester polyols used as comparative examples as indicated below.

TABLE I

| Designation | Product Name | Supplier | Description |
| --- | --- | --- | --- |
| Polyol A | Voranol 220-056N | Dow USA | 55.7 mg KOH/g OHv PPG |
| Polyol B | Voranol 220-110 | Dow USA | 108.9 mg KOH/g OHv PPG |
| Isocyanate | Mondur M, Flaked | Bayer | 4,4'- diphenylmethane diisocyanate |
| DBTDL | Dibutyl tin dilaurate | Air Products | Organotin catalyst |
| Extender | 1,4-butane diol | Air Products | Chain extender glycol |

As shown in Table II, polyol C (comparative example) is a standard PA-DEG polyol (StepanPol PS-2002) and polyols D and E are examples of polyester-ether polyols. Both these polyols were prepared by the propoxylation of a orthophthalate diethylene glycol ester (StepanPol PS-2002).

TABLE II

| Designation | Description |
| --- | --- |
| Polyol C | 52.5 mg KOH/g OHv PA-DEG glycol |
| Polyol D | 62 mg KOH/g OHv PA-DEG-propoxylate |
| Polyol E | 87 mg KOH/g OHv PA-DEG propoxylate |

Example 1

Preparation of Polyester Polyol C (Comparative Example; STEPANPOL® PS-2002)

PS-2002 is prepared as the condensation product of about 45% diethylene glycol (DEG) and 55% phthalic anhydride. Into a three gallon kettle is charged 4500 g of DEG and 5500 g PA. This mixture is heated to about 180° C. for four hours under a nitrogen atmosphere. After four hours the temperature is raised to about 180–200° C., and approximately 500 ppm of catalyst tetrabutyl titnate (Tyzor TBT, DuPont) is added to the kettle. The pressure is reduced in the kettle and removal the water by-product is begun under vacuum. The water is completely removed after about 24 hours of reaction at about 180–200° C. under vacuum. The final polyester polyol is characterized by a hydroxyl number of 190–200 mg KOH/g and has a Brookfield viscosity of about 20,000–30,000 cPs at 25° C. and an acid value less than 1 mg KOH/g.

Example 2

Preparation of Polyester-Ether Polyol D (Propoxylated Ortho-phthalate Diethylene Glycol Ester)

Into a two gallon steel pressure Chemineer kettle is charged 3678 grams StepanPol® PS-2002 and 155 grams of crushed potassium hydroxide. The mixture is blended under a nitrogen blanket for 2 hours at 120° C. A total of 7,060 grams of propylene oxide is added under a pressure of <42 psig over three hours at a temperature of about 120–125° C. A total of 500 grams of this crude product is then transferred to a flask where it is then heated to about 100° C. and degassed to remove unreacted propylene oxide. The material is then finished/neutralized: To the remaining warm mixture, 1.5 grams of Magnesol HMR-LS (The Dallas Group) is added and the mixture is then stirred at about 100–120° C. for four hours. The resulting mixture is allowed to stand warm (80° C.) for approximately 12 hours and the product is decanted and filtered through a vacuum flask equipped with a Buchner funnel and a #4 Whatman filter paper. Approximately 0.1% $H_3PO_4$ (85%) by weight of the polyol is then added. Analysis of polyol D gave the following properties:

| | |
|---|---|
| OH value = | 87 mg KOH/g (ASTM E 222 method) |
| Dynamic viscosity = | 1,200 cP @ 25° C. (Brookfield, #31 spindle) |
| % moisture = | 0.068% (ASTM D 4672 method) |
| % Propylene oxide = | 55% by weight |

Example 3

Preparation of Polyester-Ether Polyol E (Propoxylated Ortho-phthalate Diethylene Glycol Esters)

Polyol E is prepared in a similar manner to that of polyol D, except the amounts of materials used are 14.5 g KOH, 2890 g, StepanPol PS2002 and 6010 g propylene oxide. Analysis of polyol E gave the following properties:

| | |
|---|---|
| OH value = | 59.4 mg KOH/g (ASTM E 222 method) |
| Dynamic viscosity = | 1,400 cp @ 25° C. (Brookfield, #31 spindle) |
| % Propylene oxide = | 69% by weight |
| % Moisture = | 0.023% (ASTM D 4672 method) |

Example 4

Preparation of Polyester-Ether Polyol F (Propoxylated Ortho-phthalate Diethylene Glycol Ester)

Polyol F was prepared in a similar manner to than of Polyol E, but with a 128 mg KOH/g PA-DEG polyol as an initiator (438 g/eq); the initiator used is 2,965 grams of a 128 Ohv PA-DEG polyol, along with 20.1 g of 45% KOH (aqueous) and 2,360 grams of propyene oxide to give a propoxylated polyester ether polyol with an OH value of 82 mg KOH/g and subsequently finished/neutralized as described in Example 2 above. Analysis of polyol E gave the following properties:

| | |
|---|---|
| OH value = | 83.5 mg KOH/g (ASTM E 222 method) |
| Dynamic viscosity = | 22,050 cP @ 25° C. (Brookfield, #31 spindle) |
| % Propylene oxide = | 34.9% by weight |
| % Moisture = | 0.11% (ASTM D 4672 method) |

Example 5

Preparation of Polyester-Ether Polyol G (Propoxylated Ortho-phthalate Diethylene Glycol Ester)

Polyol G is prepared in a manner similar to Polyol F (2,965 grams of a 128 Ohv PA-DEG initiator, 20.1 grams of 45% KOH), but propoxylated (6,360 grams of propylene oxide) to an OH value of 53.8 mg KOH/g and subsequently finished/neutralized. Analysis of polyol E gave the following properties:

| | |
|---|---|
| OH value = | 53.8 mg KOH/g (ASTM E 222 method) |
| Dynamic viscosity = | 4,710 cP @ 25° C. (Brookfield, #31 spindle) |
| % Propylene oxide = | 58% by weight |
| % Moisture = | 0.02% (ASTM D 4672 method) |

Prepolymer Preparation

Prepolymers are generally prepared by the reaction of a polyol with an isocyanate at about 60–70° C. over a two hour period in a reactor equipped with agitation means and a slow nitrogen pad. The polyol is first warmed to 80° C. followed by the addition of the required amount of isocyanate flakes to form a mixture. The mixture is then sealed and allowed to cool over a 12 hour period to about 25° C.; the weight percent of unreacted isocyanate (% NCO) is then determined in accordance with test ASTM D 2582-80.

Dynamic viscosity is determined with a Brookfield RVT viscometer equipped with a #31 spindle, Thermocel and temperature controller. Table III gives the prepolymer nomenclature, formulations and results.

TABLE III

| Prepolymer Reference | Polyol Used and amount | Amount of MDI used | Final Prepolymer % NCO |
|---|---|---|---|
| H | Polyol A, 406.4 grams | 393.6 grams | 13.96 |
| I | Polyol B, 389.6 grams | 410.4 grams | 14.85 |
| J | Polyol D, 290 grams | 309 grams | 14.67 |
| K | Polyol C, 200 grams | 205 grams | 14.75 |

Elastomer Preparation

Elastomers are prepared by hand mixing the appropriate amount of prepolymer (H–J) with 1,4-butane diol for approximately 15 seconds, followed by the addition of one drop of DBTDL catalyst and approximately 10 seconds of additional hand mixing and casting into metal molds which are preheated to about 120° C. Elastomer parts were cured by placing the mold in a 120° C. oven for one hour, followed by removal and allowing the mold and contents to cool about 25° C. for at least four hours before extracting parts. Table IV gives formulation data for the elastomer samples (L–N).

TABLE IV

| Elastomer Designation | Prepolymer and amount | Amount of 1,4-butanediol |
|---|---|---|
| L | H, 310 grams | 45 grams |
| M | I, 170 grams | 22.7 grams |
| N | J, 294.9 grams | 45 grams |

Adhesion Sample Preparation

Adhesion samples were prepared by moistening 1"×2" stainless steel strips (Q-Panel Lab Products) with a small amount of prepolymer (Table II) and then pressing a wood tongue depressor, by means of a five pound weight, onto the steel strip for 12 hours to form a bonded sample. The bonded samples were then evaluated using a "Pull apart test" approximately 24 hours later to classify the method of failure, as detailed more fully as described below. The "Pull apart test" entails bonding two surfaces together with a particular material, allowing the bond to dry/cure at room temperature (i.e., 25° C.) for approximately 24 hours, grasping both surfaces (one in each hand) and pulling the surfaces apart, followed by visual qualitative observation of the previously bonded surfaces to look for torn substrate fragments (substrate failure), torn adhesive (cohesive failure) or one dean surface (adhesive failure).

Elastomer Sample Evaluation

Elastomers prepared in Table IV were evaluated for Tensile Strength (ASTM D 638-91 method), Elongation (ASTM D 638-91 method) and Shore A and Shore D Hardness (ASTM D-2240-91 method). The results are presented below.

|  | Elastomer L | Elastomer M | Elastomer N |
|---|---|---|---|
| Tensile Str. (psi) | 1614 | 1294 | 2163 |
| Elongation (%) | 269 | 96 | 84 |
| Shore A/D Hardness | 94/50 | 96/49 | 97/60 |

As can be seen by the above results, the formulation prepared from inventive Polyol D (in Elastomer L) exhibits greater tensile strength and elongation than that of Elastomer M, prepared from the conventional Polyol A, even though both specimens exhibit the same hardness.

Prepolymer Viscosity Evaluation (Brookfield RVT, #31 spindle, cP @ 25° C.)

| Prepolymer J | Prepolymer H | Prepolymer I | Prepolymer K |
|---|---|---|---|
| 2250 | 1035 | 2340 | 25,500 |

As can be seen by the above results, the corresponding prepolymer of a pure PA-DEG polyester polyol is approximately 25,500 cP @ 25° C., where as the prepolymer of the polyester-ether polyol material is less than 10% of that viscosity, a highly desirable characteristic.

Adhesion Evaluations

For the metal-wood bond sample formed with prepolymer H, the failure method was cohesive; i.e., as an attempt was made to separate the wood and metal members by hand, both the wood and metal separated in tact, visibly undamaged and with adhesive residue on both the formerly bonded wood and metal surfaces.

For the metal-wood bond formed with Prepolymer J, the failure method was substrate; i.e., as an attempt was made to separate the wood and metal by hand, the wood split, leaving fragments of wood bonded to the metal.

In accordance with these qualitative results, substrate failure is almost always preferred in structural (load-bearing members) bonding, since the adhesive is stronger than one of the substrates. Here, the PPG-prepolymer/adhesive failed undesirably, as compared to the prepolymer made from the novel polyester-ether polyol, i.e. the material gave a more desirable failure.

Solubility Evaluations

The following polyol materials shown In Table V were used to explore the solubility, i.e., compatibility, of inventive polyester-ether polyols in other various ester- and ether-based polyols.

TABLE V

| Designation | Polyol Name | OH value | Source | Description | Class |
|---|---|---|---|---|---|
| AA | Voranol 220-110 | 106.9 | Dow | Polypropylene glycol | Polyether |
| BB | Voranol 220-056 | 55.28 | Dow | Polypropylene glycol | Polyether |
| FF | Voranol 230-056 | 57.1 | Dow | Glycerin-polypropylene oxide triol | Polyether |
| GG | Voranol 370 | 373 | Dow | Sucrose-glycerin polypropylene oxide polyol | Polyether |

TABLE V-continued

| Designation | Polyol Name | OH value | Source | Description | Class |
|---|---|---|---|---|---|
| HH | PolyG 85-36 | 36.94 | Olin | Glycerin-polypropylene oxide triol, ethylene oxide capped | Polyether |
| II | StepanPol PS-2002 | 195 | Stepan | Phthalic anhydride-diethylene glycol | Polyester |
| JJ | StepanPol PS-3152 | 315 | Stepan | Phthalic anhydride-diethylene glycol | Polyester |
| KK | Terate 2541 | 237 | Cape | Diethylene glycol terephthalate | Polyester |
| LL | Tone 0240 | 61.49 | Union Carbide | Polycaprolactone | Polyester |

Blends of Polyol E and each of polyols in Table V above are made at weight ratios of 25:50 grams, 50:50 grams and 75:50 grams, respectively, in six ounce, open-mouth, dear flint glass jars. Similar blends are made with Polyol G. In each case (at each weight ratio), all the mixtures were visibly dear (formed soluble systems).

When Polyol E (or polyol G) are replaced in an identical series of experiments with either Polyols I, J, or N no solubility at any level was observed with any of the polyether polyols (A, B, F, G, H).

Polyol D will dissolve in either polyether or polyester glycols which is necessary to make stable two-part systems. Essentially, PA-DEG propoxylated to 55–58% propylene oxide by weight will be soluble in either ether or ester glycols. More propylene oxide by weight makes the product soluble on PPGs only; less PO with an ester is soluble only in ester glycols.

Polyester-Ether Polyol Preparation using Double Metal Cyanide Catalyst

Control/Comparative General Procedure Description

Polyester polyol initiator (such as PS2002) is combined with KOH as catalyst (either 45% aqueous solution or powdered KOH may be utilized; if added as a solution, water is stripped to ≦0.10 wt. % after addition of the catalyst). This polyester polyol-catalyst solution is charged into a 2-gallon, stainless steel Chemineer alkoxylator reactor. Propylene oxide (PO) is added to reactor to maintain the following conditions: ≦125° C. temperature, ≦75 psi pressure, with initial $N_2$ pressure of 2–3 psi. After addition of PO, the reaction was "digested"—continued to react without further addition of PO—with agitation until the rate of pressure decrease observed for the reaction stabilized. The reactor is then vented, purged with $N_2$, and the contents were drained for further treatment.

The product of the propoxylation is vacuum stripped to remove any unreacted PO still present. Hydrogen peroxide is then added lo improve the product's color. The product is then treated with Magnesol to remove the potassium catalyst, with stirring for at least one hour (to permit contact of Magnesol with water), vacuum stripped (to remove water added by Magnesol), and filtered (to remove the Magnesol/potassium amalgamated solids).

Example A (Using Standard KOH as Catalyst)

To approximately 3013 g of PS-2002 polyol in a reactor equipped with agitation, $N_2$ sparging, heat, and vacuum was added approximately 49.8 g of 45% aq. KOH solution (at KOH level of 0.2 wt-%-by-final-product-weight). The resulting solution was stripped to remove water under full vacuum at ≦130° C. for about 30 minutes (until water evolution stopped).

Next, approximately 2847 g of the above solution was charged into alkoxylator reactor. Then, as outlined above, approximately 1745 g of PO (6 mole PO/mole polyester diol) were added over 250 minutes, at an approximate rate of addition of about 330 g/hr of PO. Digestion with agitation was accomplished in about 2 hours and the time for subsequent neutrilization and removal of the potassium was about 6 hours. The final product was treated with approximately 0.04 wt. % $H_2O_2$, based on the weight of the final product, to improve color, followed by treatment with Magnesol (2.0%-by-wt.) to remove the potassium catalyst, stirred for at least one hour (to permit contact of Magnesol with water), vacuum stripped (to remove water), and filtered (to remove the Magnesol/potassium amalgamated solids).

Inventive Description and General Procedure (Using Double Metal Cyanide (DMC) Catalyst)

Polyester polyol initiator (such as PS-2002) is combined with the desired amount of DMC compound as catalyst. Generally, no stripping is necessary as no appreciable water is present Then, the polyester polyol-catalyst solution is charged into a 2-gallon, stainless steel Chemineer alkoxylator reactor. Propylene oxide (PO) is then added to the reactor to maintain the following conditions: ≦125° C. temperature, ≦75 psi pressure, with initial $N_2$ pressure of 2–3 psi. After addition of PO, the reaction is digested—continued to react without further addition of PO—with agitation until the rate of pressure decrease observed for the reaction stabilized. The reactor is then vented, purged with $N_2$, and the contents are drained for further treatment as desired. The product of the propoxylation is vacuum stripped to remove any unreacted PO still present.

A slight amount of hydrogen peroxide (e.g., 0.04%-by-wt.) may optionally be added to improve the product's color. The product may also be optionally treated with a sufficient amount of Magnesol (e.g., 2.0%-by-wt.) to remove the catalyst, stirred for at least one hour (to permit contact of Magnesol with water), vacuum stripped (to remove water), and filtered (to remove the Magnesol/catalyst amalgamated solids).

Inventive Example B (Using Double Metal Cyanide Catalyst)

To approximately 3491 g of PS-2002 was added 10.3 g of DMC compound (at catalyst level of 0.2 wt-%-by-final-product-weight); this solution was then charged into alkoxylator reactor. Then, as outlined above, approximately 2115 g of PO (6 mole PO/mole polyester diol) were added over 90 minutes, at a rate of addition of about 2950 g/hr of PO. While the material was digested for two hours (to replicate conditions of above control), the pressure had stabilized after 30 minutes of digestion. No additional time was required for subsequent handling of the material—no unreacted PO was found to be present. Approximately 0.04 wt. percent hydrogen peroxide was added to improve the product's color. The product was also treated with 2.0 wt. percent Magnesol, stirred for an one hour, vacuum stripped, and filtered (to remove the Magnesol/catalyst amalgamated solids).

Inventive Example C (Using Double Metal Cyanide Catalyst)

To approximately 3168 g of a polyester polyol (99.5 OHV, 13.8 AV, PA/Glycerine/DEG polyester triol) was added 10.0 g of DMC compound (at catalyst level of 0.18 wt-%-by-final-product-weight); this solution was charged into the alkoxylator reactor. Then, as outlined above, approximately 2460 g of PO (22.6 mole PO/mole polyester diol) was added over 125 minutes, at a rate of addition of about 1225 g/hr of PO. The material was digested for two hours. The time for subsequent handling of the material was about 30 minutes—only stripping of unreacted PO was necessary. No hydrogen peroxide was needed to improve the product's color and no Magnesol was required to remove the catalyst.

All documents, e.g., patents and journal articles, cited above or below are hereby incorporated by reference in their entirety.

From the foregoing, it will be appreciated that although specific embodiments of the invention have been described herein for purposes of illustration, various modifications may be made without deviating from the spirit or scope of the invention.

What is claimed is:

1. A method for preparing a phthalate polyester-ether polyol comprising the steps of reacting (a) about 2–60 weight % of phthalic anhydride or phthalic acid; and (b) about 40–98 weight % of diethylene glycol to form an intermediate phthalate-diethylene glycol polyester polyol, wherein the weight percents of (a) and (b) are based on the weight of the intermediate polyester polyol; and alkoxylating said intermediate polyester polyol with about 55–80% of propylene oxide based on the weight of the phthalate polyester-ether polyol in the presence of a double metal cyanide complex catalyst.

2. A method according to claim 1, wherein the double metal cyanide complex catalyst is of the formula I $$M_a^1[M^2(CN)_b(A)_c]_d \cdot wM^3D_e \cdot xH_2O \cdot yL \cdot zH_nE_m$$

wherein $M^1$ represents at least one of Zn(II), Fe(II), Co(II), Ni(II), Mn(II), Cu(II), Sn(II) or Pb(II);

$M^2$ represents at least one of Fe(II), Fe(III), Co(III), Cr(III), Mn(II), Mn(III), Ir(III), Rh(III), Ru(II), V(IV) or V(V);

$M^3$ represents $M^1$ and/or $M^2$;

A, D and E are the same or different and represent an anion;

L represents an alcohol, aldehyde, acetone, ether, ester, amide, nitrile or sulphide or mixtures thereof;

a and d are numbers to satisfy the valency state of $M^1$ and $M^2$ in the double metal cyanide part of the formula I;

b and c are integers (b>c) which together with a and d provide the electroneutrality of the double metal cyanide part of the formula I;

e is an integer satisfying the valency state of $M^3$;

n and m are integers satisfying the electroneutrality of HE, and w is a number between 0.1 and 4; x is a number up to 20;

y is a number between 0.1 and 6, and z is a number between 0.1 and 5.

3. A method according to claim 1, wherein the double metal cyanide complex catalyst is of the formula $$Zn_3[Co(CN)_6]_2 \cdot wM^3X_2 \cdot xH_2O \cdot yL \cdot zHX$$

wherein

X represents a halide;

$M^3$ represents Zn(II), Co(II) or Fe(II);

L represents an alcohol, ether or ester;

w is a number between 0.7 and 1.5;

x is a number between 2 and 10;

y is a number between 1.5 and 3, and z is a number between 0.15 and 1.5.

4. A method according to claim 1, wherein the double metal cyanide complex catalyst is of the formula $$Zn_2[Co(CN)_6]Cl \cdot 0.5HCl \cdot DME \cdot 2.75H_2O$$

where DME represents a dimethoxyethane residue.

* * * * *

UNITED STATES PATENT AND TRADEMARK OFFICE
CERTIFICATE OF CORRECTION

PATENT NO. : 6,855,844 B1
DATED : February 15, 2005
INVENTOR(S) : Eric J. Geiger and Douglas K. Hillshaffer It is certified that error appears in the above-identified patent and that said Letters Patent is hereby corrected as shown below:

Title page,
Item [54], Title, change "PHTALIC" to -- PHTHALIC --.

Signed and Sealed this

Twenty-fourth Day of May, 2005

JON W. DUDAS
*Director of the United States Patent and Trademark Office*

UNITED STATES PATENT AND TRADEMARK OFFICE
CERTIFICATE OF CORRECTION

PATENT NO.    : 6,855,844 B1
DATED         : February 15, 2005
INVENTOR(S)   : Geiger, Eric J. and Hillshafer, Douglas K.

It is certified that error appears in the above-identified patent and that said Letters Patent is hereby corrected as shown below:

<u>Title page,</u>
Item [75], Inventors, change "Hillshaffer" to -- Hillshafer --.

Signed and Sealed this

Nineteenth Day of July, 2005

JON W. DUDAS
*Director of the United States Patent and Trademark Office*